May 14, 1968         G. SCHAEFFLER         3,382,567
METHOD OF FORMING AND SECURING A SEALING DEVICE IN A BORE
Original Filed Aug. 3, 1964         2 Sheets-Sheet 1
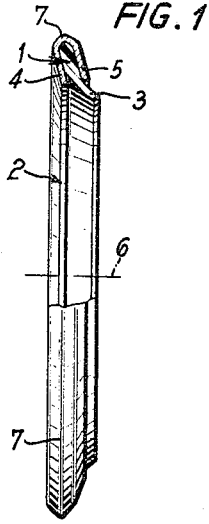
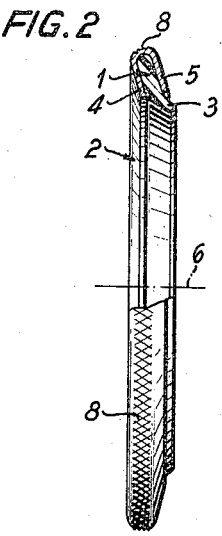
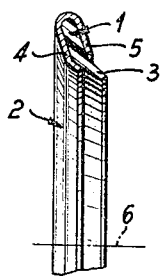
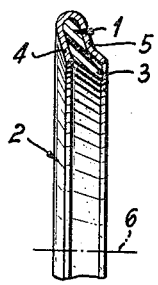
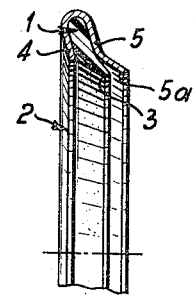
INVENTOR
GEORG SCHAEFFLER
BY
*Hammond & Littell*
ATTORNEYS May 14, 1968   G. SCHAEFFLER   3,382,567
METHOD OF FORMING AND SECURING A SEALING DEVICE IN A BORE
Original Filed Aug. 3, 1964   2 Sheets-Sheet 2

INVENTOR
GEORG SCHAEFFLER
BY
ATTORNEYS

United States Patent Office 3,382,567
Patented May 14, 1968

3,382,567
METHOD OF FORMING AND SECURING A SEALING DEVICE IN A BORE
Georg Schaeffler, Herzogenaurach, near Nuremberg, Germany, assignor to Industriewerk Schaeffler, Herzogenaurach, Germany, a corporation of Germany
Original application Aug. 3, 1964, Ser. No. 387,063. Divided and this application Nov. 14, 1966, Ser. No. 615,276
Claims priority, application Germany, Aug. 13, 1963, J 24,240
7 Claims. (Cl. 29—522)

ABSTRACT OF THE DISCLOSURE

A method of securing a shaft sealing device in a bore which device is self compensating for tolerance differences in the bore.

---

Figure 4:
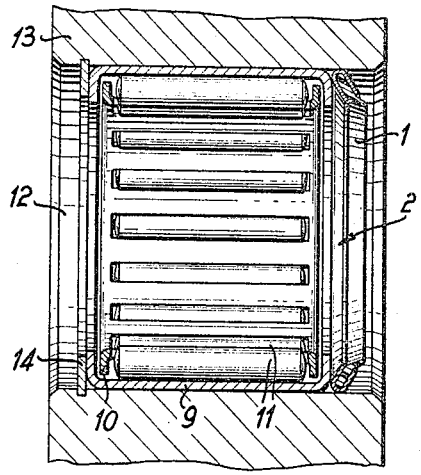

This application is a division of application Ser. No. 387,063, filed Aug. 3, 1964, now abandoned.

The invention relates to a novel method of forming and securing a sealing device which is used to provide sealing-tightness between the bore and a shaft arranged in the bore.

Shaft sealing devices are known. One such type of sealing device is arranged in shoulders or grooves in a bore, but this has the disadvantage that additional machining in the bore is required to provide the necessary groove or recess. Another type of sealing device is comprised of an elastic sealing lip arranged in a sheet metal housing which is pressed-in to securely fix the sealing device in a bore. However, this type requires maintaining very close tolerances adapted to the external diameter of the sealing device when machining the bore since this is the only way it is possible to guarantee that the sealing device will be actually mounted securely in position. Moreover, the latter sealing devices generally require a fairly considerable amount of space in the axial direction.

It is an object of the invention to provide a method of forming and securing a sealing device in a bore to provide a seal between a shaft in the bore and the bore which device does not require special machining of the bore.

It is a further object of the invention to provide a method of forming and securing a sealing device in a bore to provide a seal between a shaft in the bore and the bore which device is self-compensating for tolerance differences.

These and other objects and advantages of the invention will become obvious from the following detailed description.

The shaft sealing device of the invention which is adapted to be inserted into a bore comprises an elastic sealing disc surrounded on its external periphery and over a partial area of its faces by a metal disc which is flanged-over to a U-shaped cross-section, the limbs of the said U being substantially parallel to each other and inclined relative to the axis extending through the sealing device.

The shaft sealing device can be secured in the bore by inserting the sealing device in the bore and applying axial pressure on the inclined limbs of the U-shaped metal disc to press them flat or perpendicular to the bore whereby the outer edge of the metal disc bears rigidly against the wall of the bore. It will be apparent from the method of arranging this sealing device in a bore that there is no need to maintain exact tolerances for the bore diameter since certain diameter differences are compensated for with the plastic deformation of the metal disc surrounding the sealing disc during the pressing-in operation. Also, no special machining of the shaft bore at the place where the sealing device is to be located is required. Another advantage is that the sealing device requires an unusual small amount of axial space since its width is determined solely by the thickness of the elastic sealing disc and the sheet metal disc surrounding it. Suitable materials for the elastic sealing disc are rubber, synthetic plastic material or the like.

To ensure a reliable seating of the sealing device in a bore, the U-shaped metal disc may have one or more sharp-edged projections on its external periphery. Alternatively, the external periphery of the U-shaped metal disc may have milling or knurling for example. One or both of the U-limbs of the metal disc may be provided with projections or the like directed towards the other limb whereby the sealing disc is rigidly clamped in a reliable manner and is secured against rotational movement relative to the sheet metal disc.

The elastic sealing disc itself can be constructed by known ways as an obliquely-positioned sealing lip but, most simply, it may be punched-out as a flat disc from a thin-walled sheet of elastic material.

A preferred embodiment of the sealing disc comprises angling-over in its internal periphery one limb of the U-shaped disc towards the other disc which holds the sealing lip in an inclined position. This position reliably prevents the sealing lip from becoming inverted when the shaft is introduced into the bore.

Another preferred embodiment of the sealing device comprises angling-over in its internal periphery one limb of the U-shaped metal disc away from the other limb to protect the sealing lip from mechanical damage. This is particularly advantageous when the sealing device is at the outer edge of a housing bore where there is a greater danger that the sealing lip may be easily damaged by mechanical influences. Another modification of the last-mentioned embodiment comprises adapting the internal diameter of the angled-over limb to the external diameter of the shaft to be sealed to provide a sealing gap preceding the sealing disc.

Referring now to the drawings—

FIGS. 1 and 2 are longitudinal sectional views in the upper half and in elevation in the lower half of sealing devices of the invention.

FIGS. 3, 3a, and 3b are partial longitudinal sectional views of various modifications of sealing devices of the invention, FIG. 4 is a cross-sectional view of a bearing with a sealing device of the invention before it is fixed in the bore.

Figure 5:
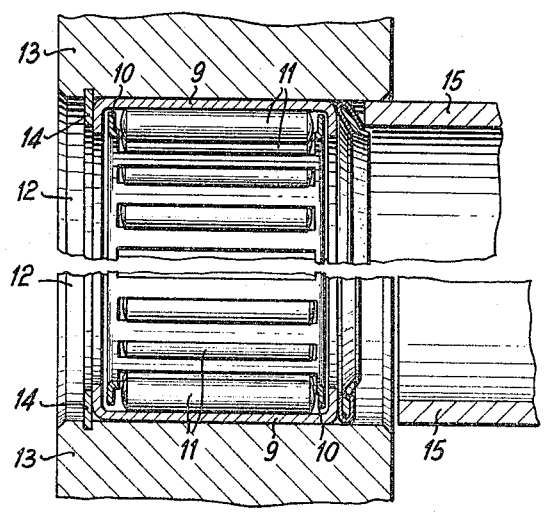

FIG. 5 illustrates the method of fixing the sealing device of FIG. 4 in the bore.

In the embodiment of FIG. 1, the sealing device is comprised of a sealing disc 1 surrounded on its external periphery and over a partial area of its faces by a sheet metal disc 2 which is flanged-over to a U-shaped cross-section. In the bore of sealing disc 1, there is a sealing lip 3. The two limbs 4 and 5 of the U-shaped metal disc 2 are substantially parallel to each other and are inclined relative to the axis 6 of the sealing device. The outer periphery of the metal disc 2 is provided with a sharp edge 7 so that the sealing device will sit securely in the bore. The embodiment of FIG. 2 differs from that of FIG. 1 simply in that the sharp edge 7 is replaced by knurled surface 8 which also acts to make the sealing device sit securely in the bore.

In the embodiment of FIG. 3, one limb of the metal disc 2 is bent-over in its internal periphery towards the limb 5 to constrainedly hold the sealing lip 3 in an inclined position which prevents the said lip from becoming inverted when a shaft is introduced. In the embodiment of FIG. 3a, the limb 5 of the metal disc 2 has in its internal periphery a bent-over portion directed away from the other limb 5 which protects the sealing lip 3 from mechanical damage. A further modification of the embodiment is illustrated in FIG. 3b wherein the limb 5 has on its internal periphery a bent-over portion 5a whose internal diameter is adapted to the external diameter of the shaft to be sealed to provide a sealing gap between the surface of the shaft and the inner edge 5a of the bent-over portion of the limb 5 which precedes the sealing lip 3 which provides an additional seal.

FIG. 4 shows a needle bearing consisting of an outer race 9 and needles 11 arranged in a cage 10 which is arranged in the bore 12 of a housing 13. The needle bearing is secured against axial displacement in the bore 12 by a spring ring 14. At the other end of the needle bearing a shaft sealing device according to FIG. 1 is inserted in the bore 12. In order to fix the sealing device in the bore 12, there is introduced into the latter an annular ram 15 which in the upper half of FIG. 5 is shown just abutting against the outer limbs of the metal disc 2 surrounding the sealing disc 1. By axial displacement of the ram 15, the sealing device is brought by plastic deformation into a position as illustrated in the lower half of FIG. 5. The two U-shaped limbs of the metal disc 2 are pressed into a position in which they stand at substantially right angles to the axis of the bore. This plastic deformation increases the external diameter of the sealing device whereby the latter is securely retained in the bore 12 after the ram 15 is withdrawn from the bore.

Various modifications of the sealing device of the invention may be made without departing from the spirit or scope thereof and it is to be understood that the invention is to be limited only as defined in the appended claims.

I claim:

1. A method of securing a shaft sealing device in a bore which comprises forming a sealing device comprised of an elastic sealing disc surrounded on its external periphery and over a partial area of its faces by a U-shaped metal disc wherein the limbs of the U are substantially parallel to each other and inclined relative to the axis of the sealing disc, inserting said sealing disc into a bore, and applying axial pressure upon the inclined limbs of the U-shaped metal disc to plastically deform and straighten the said limbs whereby the outer edge of the metal disc bears rigidly against the wall of the bore.

2. The method of claim 1 wherein the external periphery of the metal disc has at least one sharp-edged projection thereon.

3. The method of claim 1 wherein the external periphery of the metal disc is knurled.

4. The method of claim 1 wherein the elastic sealing disc has an inclined sealing lip in its bore.

5. The method of claim 1 wherein one of the limbs of the U-shaped metal disc is bent over in its internal periphery towards the other limb whereby the sealing lip is held in an inclined position.

6. The method of claim 1 wherein one of the limbs of the U-shaped metal disc is bent over in its internal periphery away from the other limb to protect the sealing lip from mechanical damage.

7. The method of claim 1 wherein one of the limbs of the U-shaped metal disc is bent over in its internal periphery away from the other limb and the internal diameter of the bent over limb is adapted to the external diameter of the shaft to be sealed to provide a sealing gap preceding the sealing disc.

References Cited

UNITED STATES PATENTS

| | | | |
|---|---|---|---|
| 1,941,025 | 12/1933 | Stein | 277—184 |
| 2,049,585 | 8/1936 | Gunthorp | 29—522 X |
| 2,259,186 | 10/1941 | Swedman. | |
| 2,586,087 | 2/1952 | Reynolds et al. | 29—148.4 |
| 2,665,818 | 1/1954 | Borges et al. | |
| 2,850,792 | 9/1958 | Cobb | 29—148.4 |
| 3,206,829 | 9/1965 | Schaeffler | 29—148.4 |
| 3,268,984 | 8/1966 | Kupchick. | |

CHARLIE T. MOON, *Primary Examiner.*